March 6, 1962     J. C. NASH     3,023,479
TENTER CLIP GATE
Filed June 30, 1959
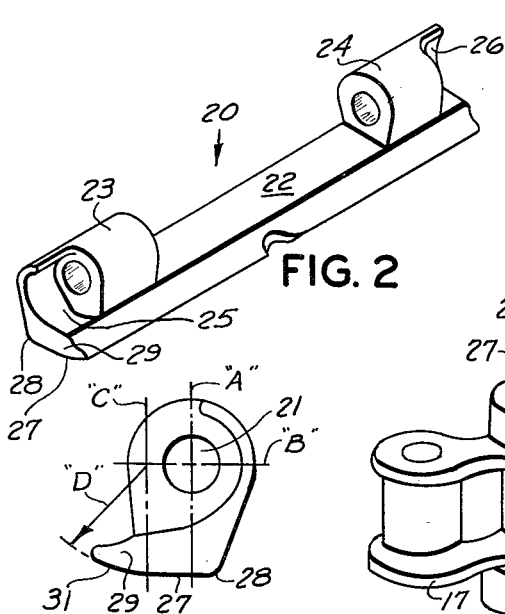
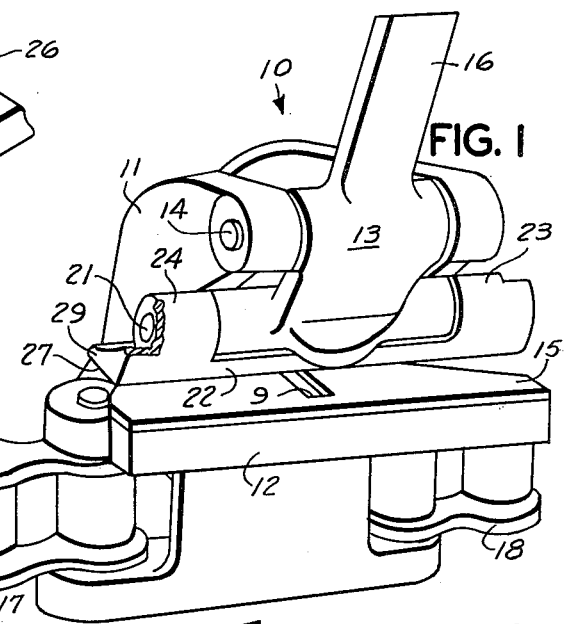
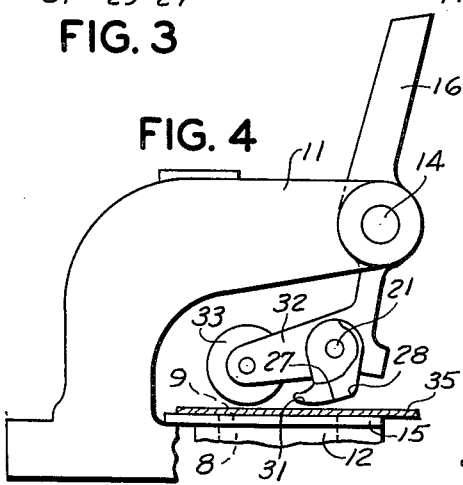
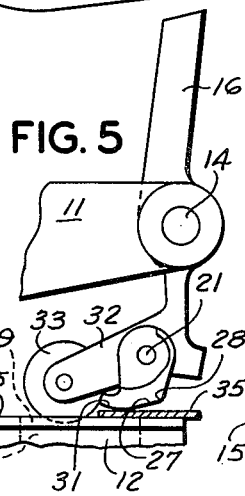
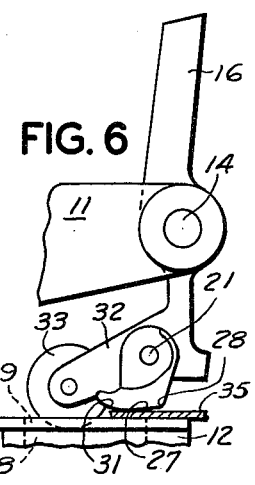
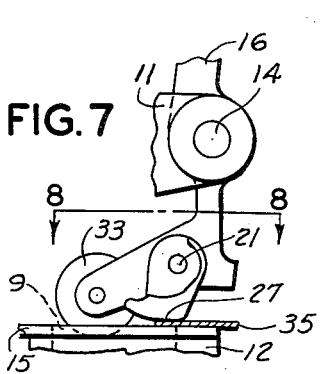
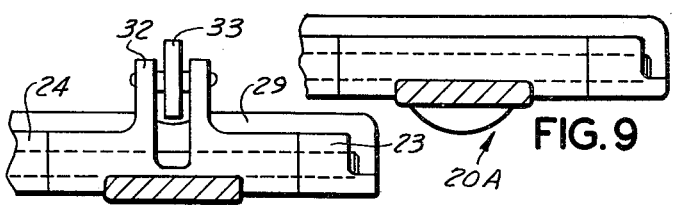
INVENTOR.
JOHN CRANDON NASH
BY
William Frederick Thorner
ATTORNEY United States Patent Office 3,023,479
Patented Mar. 6, 1962

3,023,479
TENTER CLIP GATE
John Crandon Nash, Providence, R.I., assignor to Marshall and Williams Corporation, Providence, R.I., a corporation of Rhode Island
Filed June 30, 1959, Ser. No. 823,886
7 Claims. (Cl. 26—62)

This invention relates to tenter clip gates and more particularly to the edge of the gate and thereby the type of gripping function performed by the gate.

One of the objects of the present invention is to provide a gate edge with a squeezing type of gripping function.

Another object of the present invention is to provide a tenter clip gate with a true toggle joint action and to weight the gate on the rear end.

Still another object of the present invention is to provide a tenter clip gate with a new contour on the mating edge which cooperatively engages the clamping plate.

And still another object of the present invention is to provide a tenter clip gate with an edge which will tenderly yet firmly grip extremely thin plastic sheeting between gate edge and clamping plate with an action which prevents tearing the delicate and slippery plastic sheeting.

A further object of the present invention is to provide a delicate squeezing type gripping action between a tenter clip gate and a clamping plate on thin slippery, delicate, plastic material regardless of the speed of the tentering machine.

And a further object of the present invention is to provide a uniform gripping action between a tenter clip gate and a clamping plate regardless of the thickness of the material to be gripped and without the necessity of adjustment between gate and plate.

Still a further object of the present invention is to increase the speed of production of tenter frames by providing improved gripping means between the tenter clip gate and the clamping plate.

Other objects of the present invention will be pointed out in part and become apparent in part in the following specification and claims.

In the past tenter clip gates have had a pivotal wedging type action which can be described as harsh and sudden. It was a snapping type gripping action. The violence of the mating of the gate blade with the clamping plate was particularly noticeable at high speeds where a cam would force engagement of the gate with the plate and thereby wedge the sheet material therebetween. When natural fibers such as cotton or wool were being processed the gripping action sufficed. With the advent of polyethelene sheeting or plastic film which is very thin and slippery, and subject to tearing through the slightest pressure, present tenter clip gates became useless.

In seeking to remove the harsh effects of the gripping element on the sheeting or film, all kinds of mechanical expediencies have been resorted to, from the use of soft material coatings on the gate blades to varying the material of the gate blade edges. All these means have failed to eliminate cutting and tearing of the sheet material. The material must be firmly held.

The present invention overcomes these undesirable features of the gripping element inherent in tenter clips since their inception more than a century ago by providing a new type of gripping action embodying a novel structure described in the following specification and shown in the accompanying drawing wherein like reference numerals refer to like parts.

FIGURE 1 is a perspective view of a tenter clip embodying the new and improved tenter clip gate.

FIGURE 2 is a perspective view of the tenter clip gate.

FIGURE 3 is a right side elevational view of FIGURE 2.

FIGURE 4 is a fragmentary left side elevational view of FIGURE 1 showing the gate in open or inoperative position.

FIGURE 5 is a view similar to FIGURE 4 showing the gate advancing toward closed or operative position but sufficiently open to have not as yet engaged the material to be gripped. It shows the contour of the gate shoe in relation to the material to be gripped.

FIGURE 6 is a view similar to FIGURE 5 with the gate shoe about to engage the material to be gripped.

FIGURE 7 is a view similar to FIGURE 6 showing the gate shoe firmly holding the material between gate and clamping plate.

FIGURE 8 is a horizontal cross sectional view taken along line 8—8 of FIGURE 7.

FIGURE 9 is a view similar to FIGURE 8 showing a modified form of gate.

In the following specification and claims, the terms "material to be gripped" or "cloth" are synonymous with "fabric" and/or "polyethylene sheeting" and/or "plastic film."

FIGURE 1 illustrates a tenter clip generally indicated by reference numeral 10, comprising a body member 11 having a fixed jaw 12 provided with a slot 8, and a pivoted or movable jaw 13. Jaw 13 is pivotally connected to body member 11 by means of a pintel 14. A clamping plate 15 provided with a slot 9 is secured to fixed jaw 12. Slots 8 and 9 are in vertical alignment. Movable jaw 13 is provided with an operating arm 16 adapted to be actuated by cams (not shown) which open jaw 13 to release the fabric and move jaw 13 to closed position to allow the gate to grip the fabric. Body member 11 is connected to and forms part of an endless chain of which links 17 and 18 form a part. Links 17 and 18 are pivotally connected to body member 11 in a manner old in the art.

The present invention relates to a pivotally mounted gate generally indicated by reference numeral 20 which is pivotally mounted to movable jaw 13 by means of a shaft 21. Gate 20 comprises a counterweighted body member 22 having oppositely aligned bearings 23, 24 relieved at areas 25, 26, respectively. Body member 22 is provided with a shoe face 27 having a radius 28 at the front or toe edge thereof.

Radius 28 may be termed a manufacturers radius. Referring to FIGURE 3 wherein centerlines are illustrated to show the counterweight feature of pivotally mounted gate 20 and the concomitant toggle action; vertical centerline "A" passes through the vertical center of shaft 21 and horizontal centerline B passes through the horizontal center of shaft 21. Vertical centerline "C" passes through the vertical center of gravity of gate 20 and is always located toward the rear side of gate 20. A radius "D" with its center on the vertical center of gravity C is struck from shoe face 27 rearwardly to create an arcuate surface 31 formed in the rearward area of shoe face 27. Radius "D" may be any radius struck along the line C but preferably it is located upon horizontal centerline "B" or above centerline "B." Heel 29 is of sufficient size and weight to form a counterbalance in gate 20 so that as gate 20 pivots freely upon shaft 21 heel 29 will hang downwardly as in FIGURE 4. It will be noted that jaw 13 is freely pivoted upon pintel 14 and gate 20 is freely pivoted on shaft 21 to form a type of toggle joint action. As operating arm 16 is cammed from open to closed or cloth gripping position gate 20 is counterweighted so that arcuate surface 31 slides into engagement with the cloth 35 to be gripped. See FIGURE 5. Continued rearward movement of arm 16 causes gate 20 to pivot on shaft 21 because arcuate surface 31 is frictionally engaging the cloth 35. Thus, shoe face 27 in a toggle action slides into engagement with the cloth 35, FIGURE 6. The cloth 35 under tension has a tendency to pull away from gate 20. However, the pull thus exerted by the cloth 35 merely causes gate 20 to further pivot on shaft 21 as movable jaw 13 carrying pintel 14 moves forward to lock the cloth between shoe face 27 and clamping plate 15. The vertical center of pintel 14 is always forward of the vertical center of shaft 21 so that the movable jaw 13 in forwardmost position has caused gate 20 to pivot on shaft 21 into cloth gripping position. There are two general types of tenter clips in use which in effect describe the system of tentering. In one system a controller is used. In the other system a controller is eliminated. This latter system is desirable and is the system to which this present improved gate is directed. However, the present gate can be used in either system. The controller in one form, comprises a rearwardly extending bifurcated arm 32 provided with a roller 33 integrally formed in movable jaw 13 as illustrated in FIGURES 4 through 8. The controller in another form is illustrated in United States Patent No. 1,781,138 which issued on November 11, 1930 to W. A. Stelling.

FIGURE 9 depicts a gate, generally indicated by reference numeral 20A, in which the controller is eliminated. The slot 9 is also eliminated in clamping plate 15 when gate 20A is employed. Gate 20A in all other respects is constructed in accordance with the structure described for gate 20.

Having shown and described a preferred embodiment of the present invention, by way of example, it should be realized that structural changes could be made and other examples given without departing from either the spirit or scope of this invention.

What I claim is:

1. A tenter clip comprising a body member having a fixed jaw provided with a slot on a movable jaw loosely hinged thereto so as to be normally free to move automatically into vertical relation with the fixed jaw under the action of gravity, and a controlling means including a fabric engaging member operable by engagement with a fabric for holding the movable jaw out of vertical relation with said fixed jaw, said fabric engaging member movable into said slot upon disengagement with the fabric to allow said movable jaw to assume said vertical relation with said fixed jaw, a gate comprising a counterweighted body member having bearings, said gate body member having a shoe face provided with an arcuate rear surface, said gate loosely hinged through said bearings to said movable jaw so as to be normally free under the influence of gravity due to the counterweighting of said body to move automatically into a fabric engaging position with said arcuate rear surface initially engaging the fabric when said movable jaw is in said vertical relation with the fixed jaw.

2. A tenter clip comprising a body member having a fixed jaw, a movable jaw pivotally connected to said body member, a gate comprising a body member having oppositely aligned bearings and a shoe face pivoted for independent movement upon said movable jaw, said shoe face having a rearward arcuate surface, said gate body member being counterweighted to cause said arcuate surface to first engage said fixed jaw upon movement of said movable jaw toward said fixed jaw, whereby continued movement of said movable jaw will cause said arcuate surface engaging said fixed jaw to pivot said gate into shoe face-fixed jaw engagement.

3. A tenter clip comprising a body member having a fixed jaw, a pivotal jaw having an operating arm adapted to be cam actuated and pivotally connected to said body member, a gate comprising a counterweighted body member having oppositely aligned bearings and a shoe face, a shaft fixed in said pivotal jaw, said oppositely aligned bearings pivotally mounting said counterweighted body member to said shaft and said pivotal jaw so as to be normally free to the action of gravity, said shoe face having a rearward arcuate surface free to move automatically into contact with a cloth lying upon the fixed jaw under the action of said counterweighting, said pivotal jaw in inoperative position holding said rearward arcuate surface out of contact with the cloth and said fixed jaw, but upon pivotal release of said pivotal jaw to operative position said rearward arcuate surface contacts the cloth and thereby pivots said gate around said shaft until said shoe face engages the cloth, the continued pivotal movement of said pivotal jaw into fully operative position causing said gate to pivot upon said shaft with said shoe face gliding into cloth engaging position whereby said shoe face squeezes the cloth between the fixed jaw and the shoe face.

4. A tenter clip comprising a body member having a fixed jaw, a clamping plate secured to said fixed jaw, a movable jaw pivotally connected to said body member, an arm integrally formed to said movable jaw, a gate comprising a body member counterweighted in a rear area thereof, a shoe face formed in the bottom of said gate terminating in an arcuate surface underlying said rear area, said gate having bearings, a shaft, said shaft pivotally connecting said gate through said bearings to said movable jaw to provide independent gravitational pivotal movement of said gate on said movable jaw, said arm acting as a counterweight to cause said movable jaw to pivot toward a vertical position, said arcuate surface engaging said clamping plate under the influence of gravity to cause said gate to rotate upon said shaft to rotate said shoe face into engagement with said clamping plate upon movement of said movable jaw toward said vertical position.

5. A tenter clip comprising a body member having a fixed jaw provided with a clamping plate, a movable jaw pivotally connected to said body member, an arm integrally formed to said movable jaw, a gate comprising a body member having bearings, said gate body member being counterweighted in an area to the rear of a vertical line passing through the center of said bearings, a shoe face formed in the bottom of said gate, said shoe face having a toe edge and a heel, said heel terminating in an arcuate surface underlying said area to the rear of said vertical line, the radius generating the arcuate surface being struck from a vertical line located to the rear of said first mentioned vertical line and on which lies the center of gravity of said gate, a shaft, said shaft pivotally connecting said gate through said bearings to said movable jaw to provide independent gravitational pivotal movement of said gate on said movable jaw with said heel hanging lower than said toe edge of said shoe face, said arm acting as a counterweight to cause said movable jaw to pivot toward a vertical position, said arcuate surface engaging said clamping plate under the influence of gravity to cause said gate to rotate upon said shaft to rotate said shoe face into engagement with said clamping plate.

6. A tenter clip comprising a body member having a fixed jaw provided with a clamping plate, a movable jaw pivotally connected to said body member, an arm integrally formed to said movable jaw, a gate comprising a body member having a rear surface and bearings and counterweighted on the rear surface, a shoe face formed in the bottom of said gate terminating in an arcuate surface formed as the base of said rear surface, a shaft, said shaft pivotally connecting said gate through said bearings to said movable jaw, the center of gravity of said gate being to the rear of the center of said shaft, said arcuate surface pivotally hanging lower than the forward end of said shoe face due to the counterweighting of said rear surface, whereby said arcuate surface initially engages said clamping plate to cause said gate to rotate about the pivotal point of said shaft in a toggle movement initiated by said arm acting as a counterweight to cause said movable jaw to pivot toward a vertical position under the influence of gravity.

7. A tenter clip comprising a body member having a fixed jaw and a movable jaw loosely hinged thereto so as to be normally free to move automatically into vertical relation with the fixed jaw under the action of gravity, a gate comprising a counterweighted gate body member having bearings, said body member provided with a shoe face having a contour of a horizontal surface and an arcuate surface, said horizontal surface being generated as perpendicular to a vertical line passing through the center of the pivoted connection between said gate and said movable jaw, said arcuate surface forming a continuation of said horizontal surface, said arcuate surface being generated on the vertical center line of gravity of said gate, said gate being loosely hinged through said bearings to said movable jaw so as to be normally free under the influence of gravity to move automatically into position with said arcuate surface initially engaging said fixed jaw due to the counterweighting of said body, when said movable jaw is in said vertical relation with the fixed jaw.

References Cited in the file of this patent

UNITED STATES PATENTS

| | | |
|---|---|---|
| 903,144 | Whitley | Nov. 3, 1908 |
| 1,141,081 | Whitley | May 25, 1915 |
| 1,216,943 | Champie | Feb. 20, 1917 |
| 1,219,593 | Scott | Mar. 20, 1917 |
| 2,285,820 | MacKnight | June 9, 1942 |
| 2,708,784 | Haven | May 24, 1955 |
| 2,878,546 | Kaestner | Mar. 24, 1959 |

FOREIGN PATENTS

| | | |
|---|---|---|
| 427,221 | France | May 22, 1911 |